United States Patent [19]
Lee

[11] Patent Number: 5,628,336
[45] Date of Patent: May 13, 1997

[54] POLE ASSEMBLY OF TENT

[75] Inventor: Youn-jae Lee, Seoul, Rep. of Korea

[73] Assignee: Jinwoong Ltd., Rep. of Korea

[21] Appl. No.: 585,110

[22] Filed: Jan. 11, 1996

[30] Foreign Application Priority Data

Sep. 18, 1995 [KR] Rep. of Korea ............... 95-25120 U

[51] Int. Cl.$^6$ ............................................. F16B 7/10
[52] U.S. Cl. ..................... 135/114; 135/127; 135/120.3; 135/156; 403/109
[58] Field of Search ............................. 135/127, 114, 135/120.1, 120.2, 120.3, 120.4, 156; 403/109, 367

[56] References Cited

U.S. PATENT DOCUMENTS

| | | | |
|---|---|---|---|
| 2,705,015 | 3/1955 | Langlais | 135/114 X |
| 3,223,098 | 12/1965 | Dole, Jr. | 135/127 X |
| 3,794,054 | 2/1974 | Watts | 135/127 X |
| 4,236,543 | 12/1980 | Moss | 135/127 X |
| 4,757,778 | 7/1988 | Scaglia | 403/109 X |
| 4,979,531 | 12/1990 | Toor et al. | 135/127 |
| 5,238,015 | 8/1993 | Gretzmacher et al. | 135/114 X |
| 5,417,511 | 5/1995 | Warden | 403/109 |
| 5,458,427 | 9/1995 | Simond | 403/109 |

FOREIGN PATENT DOCUMENTS

| | | | |
|---|---|---|---|
| 0690305 | 4/1940 | Germany | 135/114 |
| 0286199 | 1/1991 | Germany | 135/114 |

*Primary Examiner*—Wynn E. Wood
*Attorney, Agent, or Firm*—Dvorak and Traub

[57] ABSTRACT

The pole assembly of the tent makes the length of the pole assembly to be variable thereby tightening the tent so that the man's activity is comforted and the tent is easily disjointed.

6 Claims, 5 Drawing Sheets

POLE ASSEMBLY OF TENT

BACKGROUND OF THE INVENTION

1. Field of the Invention

This invention relates to a pole assembly of a tent and, more particularly, to a pole assembly of a tent which prevents sagging of the tent thereby maintaining the tent to be tight and makes it possible to control the height of the tent thereby easily disjointing the tent.

2. Description of the Conventional Art

In general, pole assemblies constituted frames of a tent, on which tent cloth is disposed to make man's space of action, are provided in pole rests.

As is generally known, these pole assemblies join with a plurality of poles and joining means formed on each end of the poles, and elastic members are inserted inside poles to easily joint and disjoint the tent whereby a plurality of poles constitute one assembly.

The tent is jointed by inserting the pole assemblies through the pole rests, and symmetrically connecting ends of the pole assemblies fixing the tent cloth by passing therethrough with pole holes mounted on lower side of the tent and formed in tent joint rings.

However, in these pole assemblies of the tent, each pole is joined by the joining means whereby the whole length of the pole assemblies is constantly fixed.

Accordingly, there are defects that, as the tent cloth is sagged by external force or the pole rests are extended and so on, the tent is not maintained to be tight so that man's activity is discomforted inside the tent and, in case that the tent is maintained to be tight, disjointing is difficult.

SUMMARY OF THE INVENTION

Therefore, the present invention is made in an effort to solve the above problems, the objects of the invention are to provide a pole assembly of a tent which makes the length of the pole assembly to be variable thereby tightening the tent so that the man's activity is comforted and the tent is easily disjointed.

To achieve the above objects, the present invention provides a pole assembly of a tent comprising a plurality of poles, joining means formed on each end of the poles to join the poles together, and elastic members inserted inside the poles to easily joint and disjoint the tent, wherein the poles include fixed poles in a lower end of which an connecting member inserted in pole holes formed in tent joint rings is fixed thereby forming both ends of the pole assembly and moving poles joined with the fixed poles to be able to be drawn in/out an inner circumference of the fixed poles, and the joining means include an inner joint which is fixed to upper ends of the fixed poles, forms an inner circumference so that the moving poles can move inside the inner joint, and forms an outer cone and an outer joint in which the moving pole is slidably inserted and of which inner cone is joined with the outer cone of the inner joint thereby fixing the moving pole in the fixed pole.

And, the present invention provides a cabin tent comprising a tent cloth and a plurality of pole assemblies, wherein the pole assemblies include fixed poles upwardly provided to both central portions of the longitude of the tent thereby supporting the tent from the ground, moving poles joined with the fixed poles to be able to be drawn in/out an inner circumference of the fixed poles and fixed to the upper end of the tent, an inner joint which is fixed to upper ends of the fixed poles, forms an inner circumference so that the moving poles can move inside the inner joint and forms an outer cone, and an outer joint in which the moving pole is slidable inserted and of which inner cone is joined with the outer cone of the inner joint thereby fixing the moving pole in the fixed pole.

In the pole assembly of the tent constituted as described above, when the sagging of the tent occurs owing to the external force after jointing the tent, the sagging of the tent can be removed by separating the outer joint from the inner joint, then drawing out the moving pole from the fixed pole thereby extending the whole length of the pole assembly, and then joining the inner cone of the outer joint with the outer cone of the inner joint thereby maintaining the extending of the pole assembly.

Further, in case of disjointing the tent, the outer joint and inner joint are separated first from the pole assembly so that the tent can be easily disjointed.

BRIEF DESCRIPTION OF THE DRAWINGS

Further objects and other advantages of the invention will become apparent from the following description in conjunction with the attached drawings, in which.

DETAILED DESCRIPTION OF THE PREFERRED EMBODIMENT

Figure 1:
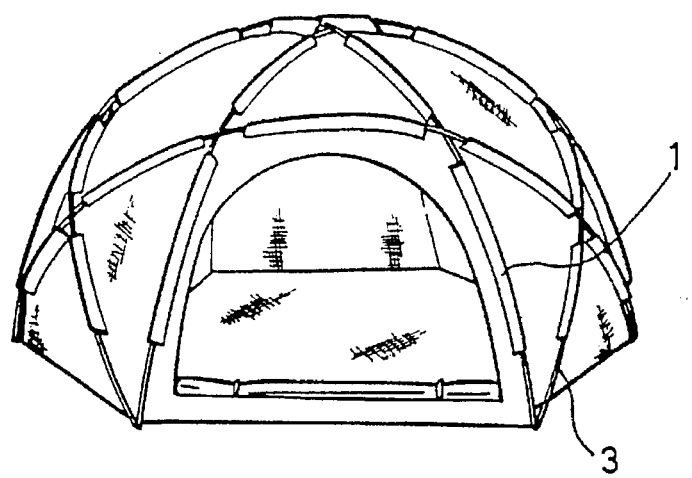
FIG. 1 is a schematic perspective view showing a dome tent employing pole assemblies in accordance with an embodiment of the invention.

FIG. 1 is a schematic perspective view showing a dome tent employing pole assemblies 3 in accordance with an embodiment of the invention, and which shows the tent that the pole assemblies 3 are inserted in a plurality of pole rests 1 provided in a tent cloth thereby making man's space of action.

Figure 2:
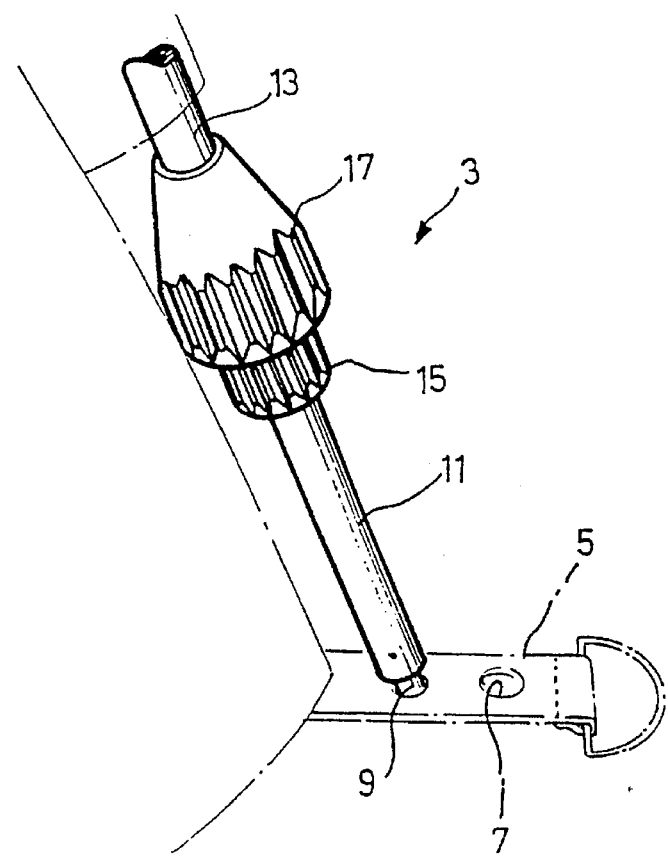
FIG. 2 is a partial perspective view showing a tent employing pole assemblies in accordance with an embodiment of the invention.

As shown in FIG. 2, each end of the pole assemblies 3 is connected to pole holes 7 formed in tent joint rings 5 formed in the lower side of the tent.

The pole assemblies 3 include connecting member 9 joined in the pole holes 7, fixed poles 11 wherein the connecting member 9 is fixed to one side thereof, moving poles 13 movably inserted in the inner side of the fixed poles 11.

Figure 3:
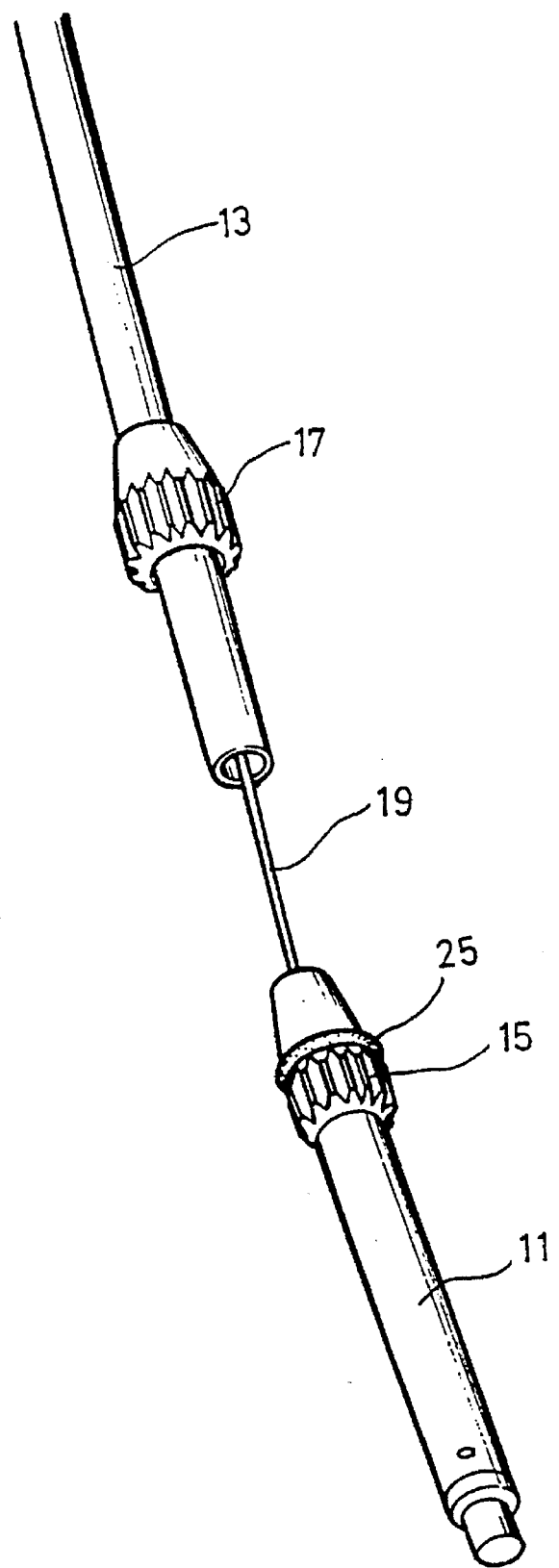
FIG. 3 is a perspective showing a separated pole assembly in accordance with an embodiment of the invention.

Further, as shown in FIG. 3, the fixed pole 11 is provided with an inner joint 15 in the upper end thereof, and the moving pole 13 is provided with and outer joint 17 slidably inserted thereof.

And, the fixed pole 11 and the moving pole 13 are connected with each other by lying an elastic member 19 therebetween thereby easily joined and separated each other.

Figure 4:
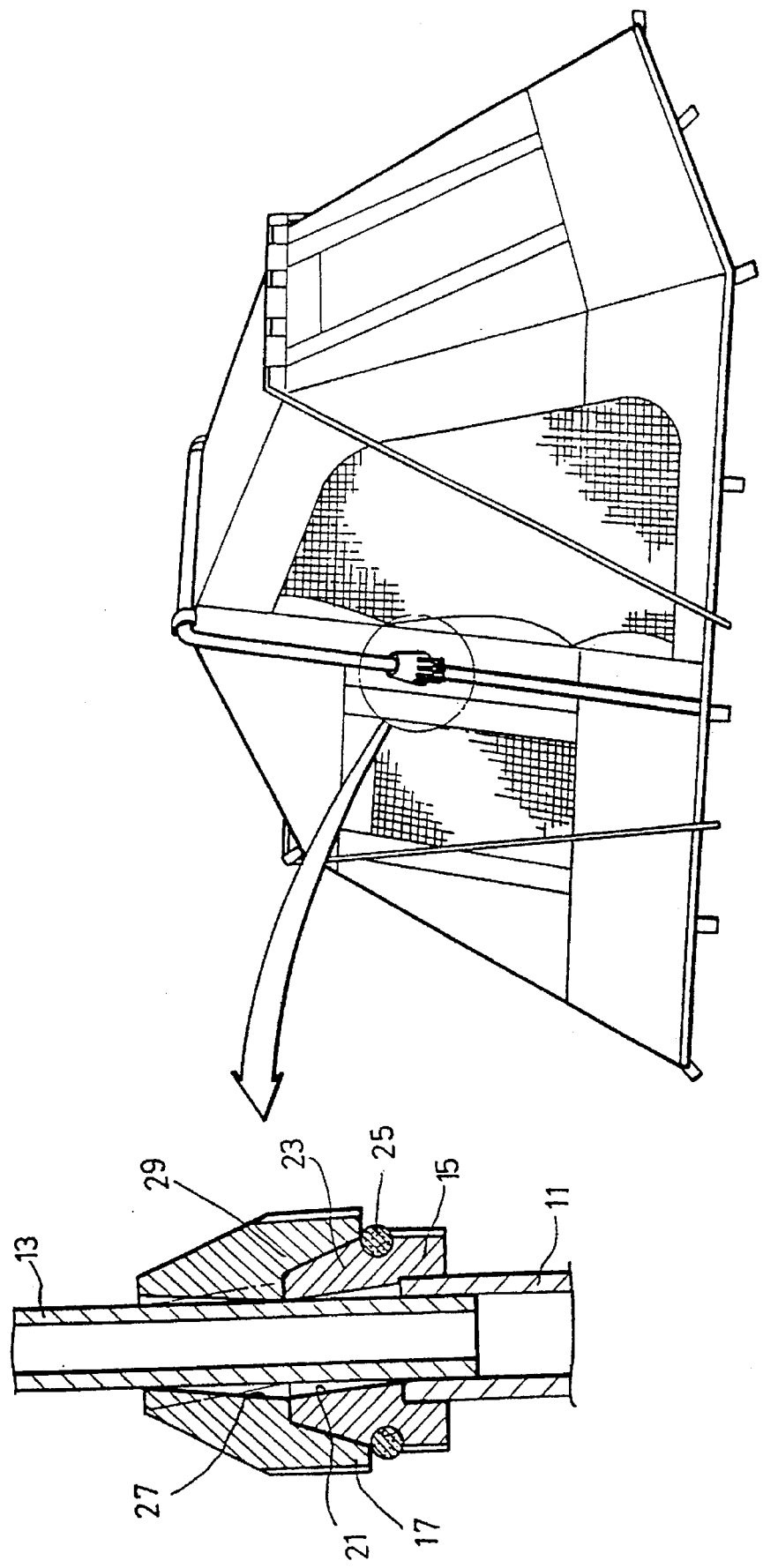
FIG. 4 is a schematic perspective view showing a cabin tent employing pole assemblies in accordance with an embodiment of the invention.

As shown in FIG. 4, the inner joint 15 fixed to the upper end of the fixed pole 11 forms an inner circumference 21 for the moving pole 13 to be moveable through the inside of the inner joint 15 and the fixed pole 11, and forms an outer cone 23 in the outside thereof.

Further, an O-ring 25 for easily separating the outer cone 23 and outer joint 17 is disposed to one side of the outer cone 23 of the inner joint 15.

And, the outer joint 17 forms an inner circumference 27 for the moving pole 13 to be slidable, and forms an inner cone 29 joined with the outer cone 23 of the inner joint 15.

In particular, the center line of the inner circumference 21 of the inner joint 15 and the center line of the inner circumference 27 of the outer joint 17 are crossed with the center line of the inner circumference of the fixed pole 11 or moving pole 13.

FIG. 4 is a schematic perspective view showing a cabin tent employing pole assemblies in accordance with an embodiment of the invention, wherein the cabin tent is provided with a plurality of the pole assemblies 3 to maintain the tent to be tight, and in particular the pole assembly 3 which is provided to both central portions of the longitude of the tent thereby fixed to both ends of the upper side of the tent, includes the fixed pole 11 supporting the tent from the ground in the lower side thereof, and the moving pole 13 slidably disposed inside the fixed pole 11 and fixed to the upper end of the tent.

Further, the inner joint 15 is fixed to the upper end of the fixed pole 11 in the lower side of the tent, the moving pole 11 is slidably provided with the outer joint 17 and is joined with the inner joint 15 thereby varying the length of the pole assembly 3.

Figure 5:
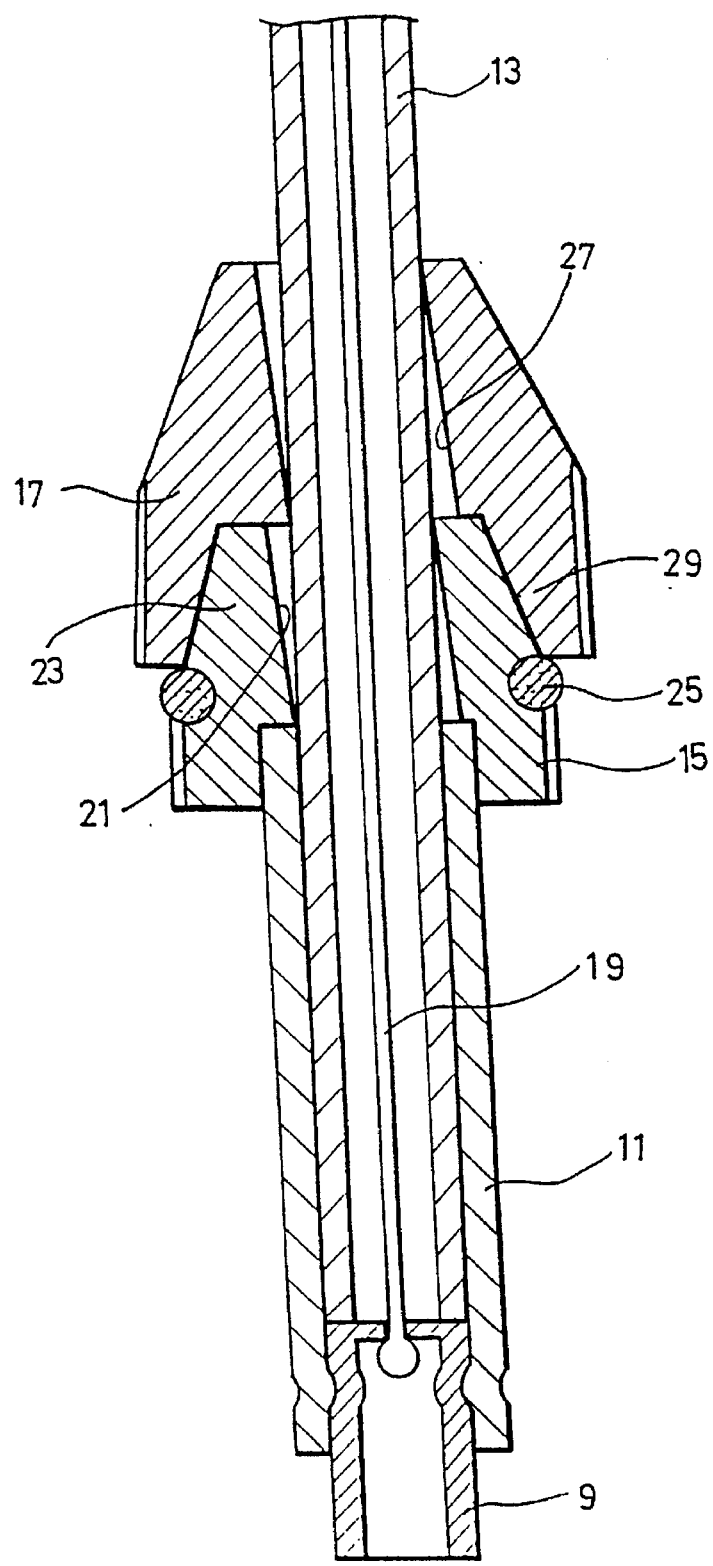
FIG. 5 is a sectional view showing a pole assembly in accordance with an embodiment of the invention.
Figure 6:
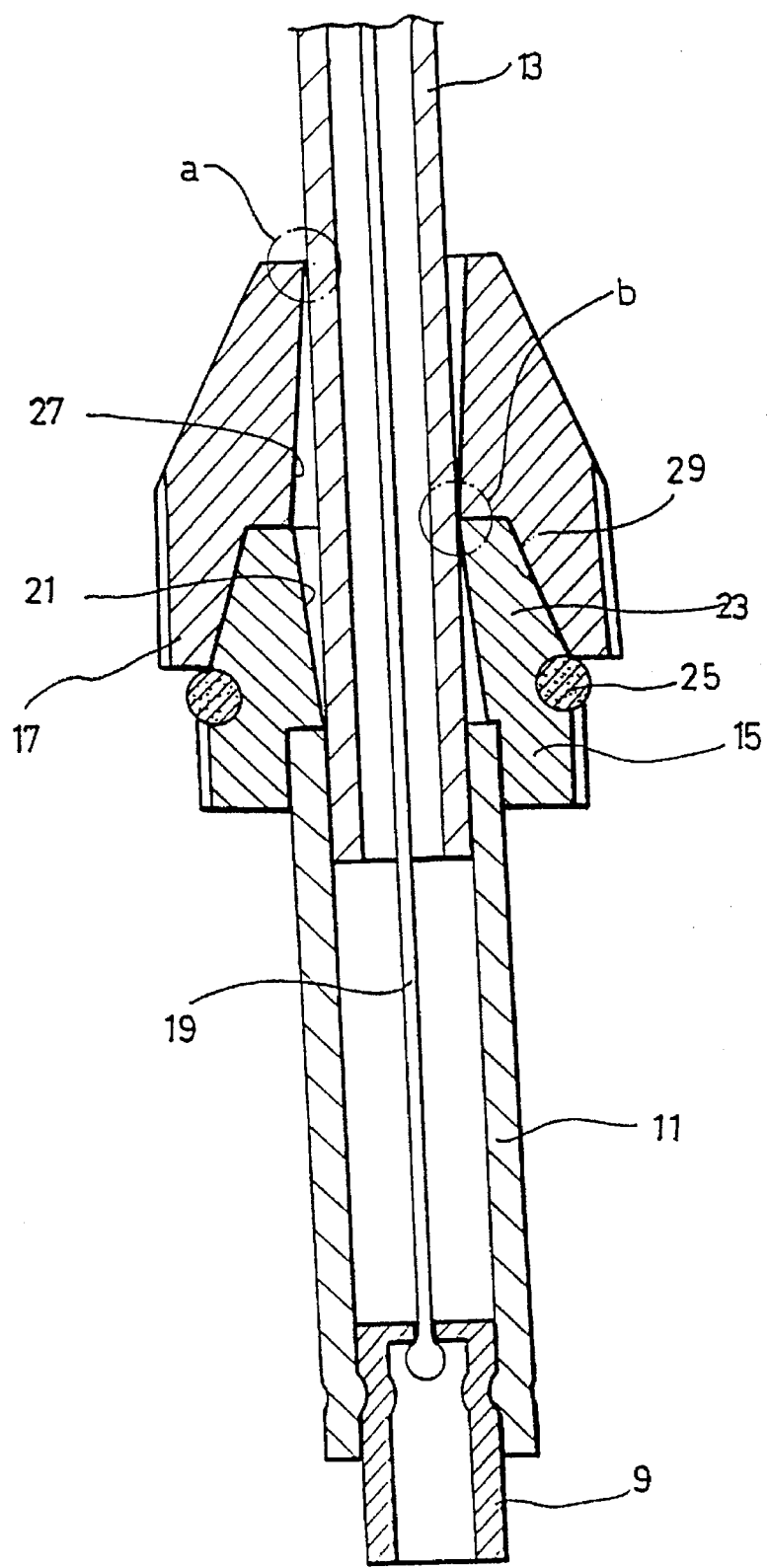
FIG. 6 is a sectional view showing a pole assembly in accordance with an embodiment of the invention.

When the tent is jointed with the pole assemblies 3 constituted as described above, as shown in FIG. 5, the moving pole 13 is inserted inside the fixed pole 11, the joining of the inner joint 15 and the outer joint 13, as shown in FIG. 6, is achieved by rotating the outer joint 17 thereby crossing the imaginary center line of the inner circumference 27 thereof with the imaginary line of the inner joint 15 fixed to the fixed pole 11 so that the moving pole 13 is fixed to the fixed pole 11.

In the course of using the tent jointed as the above, When the sagging of the tent is occurred by the external force, the user rotates the outer joint 17, as shown in FIG. 5, so that the imaginary center line of the outer joint 17 aligns with the imaginary center line of the inner joint 15, and then drawing out the moving pole 13 from the fixed pole 11.

Further, in state of the moving pole 13 to be drawn out from the fixed pole 11, the user rotates the outer joint 17 so that the imaginary center line of the outer joint 17 is crossed with the imaginary center line of the inner joint 15 as shown in FIG. 6 thereby fixing the moving pole 13 to the fixed pole 11.

As described above, when the outer joint 17 is rotated so that the center line of the inner circumference 27 of the outer joint 17 and the center line of the inner circumference 21 of the inner joint 21 are crossed each other, the moving pole 13 is solidly fixed to the fixed pole 11 by the frictional force of fixed contact portions a and b and the moving pole 13.

As the moving pole 13 is drawn out from the fixed pole 11 as described above, the whole length of the pole assembly 3 is extended so that the sagging of the tent is excluded thereby maintaining the tent to be tight.

And, in case of disjointing the solidly jointed tent, the outer joint 17 and the inner joint 15 is separated so that the whole length of the pole assembly 3 is shortened thereby making the tent to be easily disjointed.

As described above, in the pole assembly of the tent according to the invention, the moving pole draws in/out the fixed pole so that the sagging of the tent is prevented thereby maintaining the tent to be tight thereby comforting the man's activity in the tent, and the tent is easily disjointed.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A pole assembly of a tent having tent pole rings comprising:

a plurality of poles, joining means formed on each end of said poles to join said poles together, and elastic members inserted inside said poles to easily joint and disjoint the tent, wherein each of said poles includes fixed poles having connecting members on lower ends, said connecting members being inserted in pole holes formed in tent joint rings, thereby forming both ends of the pole assembly, and moving poles joined with the fixed poles to be able to be drawn both into and out of an inner circumference of the fixed poles, and wherein said joining means includes an inner joint fixed to the upper ends of the fixed poles, having an inner circumference with an imaginary center line which allows the moving poles to be moveably inserted through the inner joint and the fixed poles, and an outer joint rotatably connected to the inner joint, also having an inner circumference with an imaginary, center line which allows the moving poles to be moveably inserted through the outer joint and the fixed poles when the center line of the outer joint is in alignment with the center line of the inner joint, and whereby rotating the outer joint with respect to the inner joint causes the center line of the outer joint to intersect the center line of the inner joint which causes the moving poles to become fixed against the inside of the fixed poles such that the moving poles are no longer moveable inside the fixed poles.

2. The pole assembly of the tent according to claim 1, wherein the moving pole has an imaginary center line and the center line of the inner circumference of the inner joint intersects the center line of the moving pole.

3. The pole assembly of the tent according to claim 1, wherein the moving pole has an imaginary center line and the center line of the inner circumference of the outer joint intersects the center line of the moving pole.

4. A cabin tent comprising a tent cloth and a plurality of pole assemblies, wherein said pole assemblies comprise:

fixed poles upwardly provided to central portions of a longitudinal dimension of the tent thereby supporting the tent from the ground, moving poles, movably joined with the fixed poles and capable of being drawn into and out of an inner circumference of the fixed poles, and fixed to the upper end of the tent, an inner joint which is fixed to upper ends of the fixed poles, having an inner circumference so that the moving poles can move inside the inner joint, and forming an outer cone, and an outer joint having an inner circumference and an inner cone in which the moving pole is slidably inserted and of which inner cone is rotatably joined with the outer cone of the inner joint thereby fixing the moving pole in the fixed pole.

5. The pole assembly of the tent according to claim 1, wherein the inner joint has an outer circumference forming an outer cone and the outer joint has a second inner circumference forming an inner cone whereby the the inner and outer joints are rotatably connected at the respective outer and inner cones.

6. The pole assembly of the tent according to claim 5, wherein the outer joint is provided with an O-ring disposed to one side of the outer cone, for easily separating the inner joint and the outer joint.

* * * * *